United States Patent Office 2,943,081
Patented June 28, 1960

2,943,081

OLEFIN POLYMERIZATION AND CATALYST COMPOSITION THEREFOR

Edward George Howard, Jr., Hockessin, Del., assignor to E. I. du Pont de Nemours and Company, Wilmington, Del., a corporation of Delaware No Drawing. Filed Apr. 30, 1956, Ser. No. 581,321

19 Claims. (Cl. 260—88.2)

This invention relates to novel catalysts useful in the polymerization of olefins. It also relates to a novel polymerization process, and particularly to an improved process for the polymerization of ethylene.

Because of the remarkable combination of properties and relatively low cost of the polyethylenes, their use in the plastics and related industries has expanded yearly since their introduction in 1939. Today, polyethylene occupies a major place among the large volume of industrial chemicals. As a result of this industrial activity, a search for catalysts which will either polymerize ethylene under milder conditions than those currently in use or which will produce tougher polymer, or which will accomplish both of these objectives, has been an important research objective for several years. Recently discovered catalysts include reduced molybdenum-oxygen compounds extended on inert carriers and alkali metal promoted reduced molybdenum-oxygen compounds alone or extended on inert carriers. The activity of these catalysts is believed to be characteristic of reduced metal oxides of group VIb of the periodic table of elements, particularly molybdenum and tungsten-oxygen compounds containing the metal in the sub-hexavalent state.

It is an object of the present invention to provide novel catalysts for the polymerization of olefins and particularly for the polymerization of ethylene to high molecular weight polymers. It is a further object to provide an improved process for the polymerization of ethylene. Another object is to provide improvements in the preparation of the catalyst. Further objects will become apparent hereinafter.

In accordance with the present invention highly useful polymerization catalysts are obtained when metal oxides, wherein the metal is selected from group IVb of the periodic table of elements, are extended on alumina, said group IVb metal oxides being the sole compounds of transition elements present, and thereafter contacting said metal oxide extended on alumina with an alkali or alkaline earth metal of atomic numbers 3 through 56 under vacuum. In its preferred embodiments this invention comprises the use of such alkali or alkaline earth metal reduced group IVb metal oxides extended on alumina for the polymerization of ethylenically unsaturated monomers and particularly ethylene to high molecular weight polymers of outstanding toughness in high yields.

The molecular structure of the catalytically active complex has not yet been determined. However, it has been found that both the alumina and the group IVb metal oxide are integral parts of the catalyst. In the absence of either no significant polymerization of the ethylene to high molecular weight solid polymer is obtained.

The compositions of this invention are made by subjecting a group IVb metal oxide-on-alumina to the action of the vapor of an alkali or alkaline earth metal of atomic numbers 3 through 56 under vacuum.

In the preferred method for preparing the compositions of this invention, alumina is impregnated with an organic solvent solution of a group IVb metal alkoxide and the impregnated alumina is then treated so as to convert the group IVb alkoxide to the corresponding oxide. The resulting product is placed in a furnace and the vapor of an alkali or alkaline earth metal of atomic numbers 3 through 56 is distilled under vacuum through the group IVb metal oxide-on-alumina for from 1 to 20 hours. Thereafter, the treated composition is permitted to cool in an inert atmosphere and stored under a blanket of an inert atmosphere, such as argon, helium and neon. Other methods of extending the group IVb metal oxides on alumina may employed, however, the above disclosed method gives rise to exceedingly high polymerization rates and polymer yields.

The alkali or alkaline earth metal reduced group IVb metal oxide-on-alumina can be employed in the form of pellets of spherical, cylindrical, or other shapes. If desired, however, it can also be employed in finely divided form.

The alkali and alkaline earth metals used in the reduction are lithium, sodium, potassium, rubidium, cesium, beryllium, calcium, magnesium, strontium and barium. Of these, sodium is a preferred metal because of its availability and relatively low cost.

The amount of alkali or alkaline earth metal is at least 1% based on the group IVb metal oxide present in the composition. In general, satisfactory results are obtained employing from 5% to 1000% of the group IVb metal oxide present in the composition and an amount within this range is usually employed.

The alumina component may be a commercial preparation, or it may be made in any known manner. Thus, the alumina may be made by dehydrating hydrous alumina as described in Ind. Eng. Chem. 42, 1398 (1950); U.S. 2,453,327, issued to G. T. Layng and F. T. Suman on November 9, 1948, and H. D. Weiser's "Colloid Chemistry," John Wiley & Sons, Inc., New York (1949), 2nd Ed., or by gel precipitation from salt solutions as disclosed in U.S. Patent 2,432,286, issued to William H. Claussen and Homer B. Wellman on December 9, 1947, or from metallic aluminum as disclosed in U.S. Patent 2,274,634, issued to Llewellyn Heard on March 3, 1942.

In a convenient and practical method for using the alkali or alkaline earth metal reduced group IVb metal oxide-on-alumina compositions as catalysts for polymerizing monoolefins, such as ethylene, a pressure reactor of about 400 cc. capacity is purged with water-and-oxygen free argon, charged with the alkali or alkaline earth metal reduced group IVb metal oxide-on-alumina composition and, if desired, a liquid organic reaction medium, e.g., cyclohexane, pentane, xylene, toluene, etc., in sufficient amount to occupy about one-fourth of the reactor volume is added. The reactor is placed in a reciprocating rack equipped with heating means and pressured with ethylene. Heating and agitation are started, and when the temperature has reached the range selected for operation, the pressure is adjusted to the desired level by admitting more ethylene under pressure. The reaction is permitted to proceed for at least two hours but may be carried on for periods up to 20 hours or more. During this reaction time, the pressure is maintained by periodic injections of ethylene. Thereafter the reactor is allowed to cool, opened, and the contents removed. The reaction product is a tough, white solid containing embedded catalyst. It is subjected to fractional extraction with an organic solvent, such as xylene to separate the polymer and the catalyst. The polymer is removed from the extract, conveniently by dilution with a non-solvent such as methanol. The precipitated polymer is dried at room temperature and is a white tough solid.

The examples which follow are submitted to illustrate, and not to limit, this invention.

EXAMPLE I

A. Preparation of ZrO₂/Al₂O₃

To a solution of 35 g. of tetrabutyl zirconate in 60 ml. of cyclohexane was added 110 g. of alumina. After standing for two days, the product was collected by filtration, washed with benzene, and placed in one liter of water for four days. This removed the organic part of the zirconate ester by hydrolysis. The solid was dried at 500° C. for 20 hours. The product contained 1.93% Zr by analysis.

B. Sodium reduction of the zirconia-on-alumina

A 1″ x 24″ nickel tube was closed at one end by welding and sheathed with two independently operated quartz fabric-encased electric heaters. A 0.5″ x 3″ nickel tube was charged with 6 g. of metallic sodium and the charged tube placed at the bottom of the larger tube. A 100-mesh stainless steel screen was then supported on the upper end of the smaller tube. A thermocouple well was then placed within the larger tube so that it extended to the surface of the screen. Fifty grams of the zirconia-on-alumina prepared as above was added to the larger tube, the assembly connected to a vacuum train, the system evacuated to about 0.3 mm. to remove any water still present, and the portion containing the zirconia-on-alumina heated to 475°±15° C. During the heating, the pressure rose to a level between 2 and 3 mm., but within 1 to 2 hours it became stabilized at 0.4 mm. The portion of the tube containing the sodium was heated to between 450° and 460° C. for four hours. Thereafter, the tube was allowed to cool to room temperature and brought to atmospheric pressure with argon. The dark blue product obtained was sealed under argon in glass ampules. The product containing 2.90% Zr and 7.75% Na. It became hot on exposure to air and assumed a white color.

C. Ethylene polymerization

A stainless steel pressure reactor was charged with 90 g. of cyclohexane (distilled and sodium dried) and 7.6 g. of sodium reduced zirconia-on-alumina, prepared as above. The reactor was sealed immediately, pressured with ethylene to 300 lb./sq. in., and heated to 120° C., at which point the pressure was brought to 1000 lb./sq. in., there was a total pressure drop of 945 lb./sq. in. The dried polymer obtained weighed 48 g.

EXAMPLE II

A. Preparation of thorium-on-alumina

To a solution of 20 g. of thorium nitrate in 600 ml. of water there was added 100 g. of γ-alumina with occasional stirring. After standing for 10 days, the solid was collected by filtration, washed with water, and dried at 450° C. for five hours. Analysis: Th, 1.71%.

B. Sodium reduction of the thorium-on-alumina

Following the procedure described in Example I, 50 g. of the thoria-on-alumina, prepared as described above, was reduced with 5 g. of sodium at a pressure of 0.3–0.5 mm. at 475±15° C. for four hours. The product obtained was found by analysis to contain 1.16% thorium.

C. Ethylene polymerization

A polymerization was conducted, as previously described, at 120° C. under 1000 lb./sq. in. ethylene pressure, employing 7.9 g. of the catalyst prepared as above. During a 10-hour reaction time, there was an observed pressure drop of 105 lb./sq. in. There was obtained 3.6 g. of solid polyethylene and 1 g. of grease.

EXAMPLE III

Table I summarizes a series of experiments carried out in accord with the procedure described in Part A of Example I and Table II the reduction of the compositions with alkali and alkaline earth metals, as described in Part B of Example I.

Table I
PREPARATION OF GROUP IVb METAL OXIDES-ON-ALUMINA

| Identity | Support | Solvent | Group IVb Metal Cpd Used as source of metal oxide | Percent of Group IVb Metal Deposited on Support |
|---|---|---|---|---|
| (A) | Al₂O₃ ᵃ | Benzene | Ti[OCH(CH₃)₂]₄ | 2.19 |
| (B) | Al₂O₃ ᵇ | do | Ti[OCH(CH₃)₂]₄ | 3.98, 3.97 |
| (C) | Al₂O₃ | Water | Th(NO₃)₄ | 1.71 |
| (D) | Al₂O₃ ᵈ | Cyclohexane | Zr(OBu)₄ | 1.93 |
| (E) | Al₂O₃ | Benzene | Ti[OCH(CH₃)₂]₄ | 2.99 |
| (F, G, H) | Al₂O₃ | do | Ti[OCH(CH₃)₂]₄ | 2.99 |
| (I) | Al₂O₃ | | | |

ᵃ Analyses 85% Al₂O₃; 2% Na₂O; 0.15% Fe₂O₃; 6.3% SiO₂; surface area 350 m²/g.; pore diameter 50A; loss on ignition 6.2%.
ᵇ Fibrous Al₂O₃ made by oxidation of Al.xHg.
ᶜ Commercial grade.
ᵈ Organic portion removed by heating in air at 450° C.

Table II
REDUCTION OF GROUP IVb METAL OXIDES-ON-ALUMINA WITH ALKALI AND ALKALINE EARTH METALS

| Identity | Reducing Metal | Reduction Temp., °C. | Reduction Pressure, mm. | Reduction Time, Hrs. | Analysis of Reduced Comp. |
|---|---|---|---|---|---|
| (A) | Sodium | 450–460 | 0.40 | | |
| (B) | do | 475 | 0.50 | 5.0 | |
| (C) | do | 475 | 0.40 | 2.5 | Ti, 4.48, 4.25. |
| (D) | do | 475 | 0.30–0.50 | 5.0 | Th, 1.16. Na, 22.3. |
| (E) | do | 460–490 | 0.40 | 4.0 | Zr, 2.90. Na, 7.75. |
| (F) | Lithium | 690–710 | 0.07 | 2.0 | Ti, 2.99. Li, 16.0. |
| (G) | Magnesium | 700 | 0.20–0.30 | 3.0 | Ti, 2.99. Mg, 1.17. |
| (H) | Calcium | 700–720 | 0.25 | 3.0 | Ti, 2.78. Ca, 0.28. |
| (I) | Sodium | 475 | 0.40 | 5.0 | |

Table III summarizes a series of ethylene polymerizations employing the reduced group IVb metal-on-alumina catalysts prepared as described above and cyclohexane as the reaction medium, following the procedure described in Example 1 (C).

*Table III*

ETHYLENE POLYMERIZATIONS WITH REDUCED GROUP IVb METAL ALUMINA CATALYSTS

| Identity | Temp., °C. | Pressure, p.s.i. | Catalyst Wgt., g. | Polymer Yield, g. |
|---|---|---|---|---|
| (A) | 250 | 2,500 | 7.6 | Trace |
| (B) | 120–164 | 1,000 | 8.2 | 25 |
| (D) | 120 | 600 | 7.9 | 3.6 |
| (E) | 120 | 1,000 | 7.6 | 48.0 |
| (F) | 120 | 1,200 | 8.3 | 230 |
| (G) | 170 | 1,000 | 7.0 | 22 |
| (H) | 170 | 1,000 | 7.0 | 55 |
| (I) | 120 | 1,000 | 7.5 | 168 |

EXAMPLE IV

The catalyst was prepared from the product obtained by hydrolysis of $Ti[OCH(CH_3)_2]_4$ which had been adsorbed on alumina pellets. On removal of the water of hydrolysis by heating, 50g. of the $TiO_2$-alumina pellets (3.8% Ti) was treated with lithium vapor from 3.93 g. of lithium metal at 600–620° C. and 0.35–1.00 mm. Hg.

Into a 400 ml. stainless steel lined high pressure vessel was placed 7.52 g. of the above prepared catalyst and 100 ml. of cyclohexane. The bomb was flushed with nitrogen, evacuated and then charged with 28 g. ethylene and 42 g. propylene. The vessel was then heated at 100° C. under autogenous pressure with agitation for 8 hours. The solvent was removed from the cooled contents of the bomb to yield 50 g. total solids. A 1.0 g. portion of this material was refluxed for 24 hours with benzene and the decanted solution treated with methanol. The precipitated polymer weighed 0.28 g. The infra red spectrum of a film pressed from this soluble portion indicated 27.3% propylene.

EXAMPLE V

The catalyst was prepared by treating 31.90 g. of $TiO_2$-alumina pellets (3.8% Ti) obtained as in Example IV, with sodium vapor from 3.1 g. sodium metal at 528–583° C. and 15–28 mm. Hg.

Into a 400 ml. silver-lined high pressure vessel was charged 5.64 g. of the above prepared catalyst, 100 g. cyclohexane, 60 g. of propylene and 15 g. ethylene. The vessel was heated to 125° C. for 8 hours with agitation. The solid contents obtained weighed 28.9 g. A 1.0 g. portion gave 0.29 g. benzene soluble polymer, the infra red spectrum of which indicated 22.2% propylene.

EXAMPLE VI

Following the procedure of Example I, the reactor was charged with 9.1 g. of catalyst F, Table II, 100 ml. of cyclohexane and pressured to 200 p.s.i. propylene at room temperature. The charge was then heated at 120° to 175° C. for 14.5 hours under 1300 to 3000 lb./sq. in. of propylene pressure. From the reaction mixture, there was obtained 4 g. of solid polypropylene which consisted of two parts; one part was soluble in cold cyclohexane and from this solution a film was cast which was transparent and elastic, the other was soluble in hot toluene. When the polymer was isolated, it was opaque and hence crystalline.

EXAMPLE VII

The catalyst was prepared by hydrolysis of $Ti[OCH(CH_3)_2]_4$ which had been adsorbed on fibrous $Al_2O_3$ (the hydrolysis was effected by passing water containing air over the ester or the $Al_2O_3$), and treating with Na vapor at 475° C. for 7.5 hours. It was a blue-black pyrophoric solid. Analysis: Ti, 4.48, 4.25%.

This material was added to oxygen-free styrene while in an argon atmosphere. The styrene was polymerized to a hard solid in 10 minutes.

The inclusion of a liquid inert reaction medium in the reaction zone in contact with the catalyst is not necessary, but it is desirable because it produces a desirable effect in facilitating temperature control and bringing about better contact between the ethylene and the catalyst. Various classes of individual hydrocarbons or mixtures of hydrocarbons which are liquid and substantially inert under polymerization conditions can be employed. Examples of such hydrocarbons are benzene, heptane, toluene, xylene, xylene-p-cymene mixtures, cyclohexane, ethyl xylenes, etc.

In a batch process the amount of liquid reaction medium generally occupies about one-fourth of the reactor volume. In continuous operation, however, the liquid reaction medium may be present in amounts which may range from about 10 to about 90% by weight of the ethylene being processed.

Although in the preferred practice a liquid reaction medium is used, the polymerization can be effected in the gaseous phase in the absence of a reaction medium. In this event the catalyst may be employed in the form of fluidized particles, as a fixed bed, or as a counter-current or co-current bed of particles. A moving bed or slurry of catalyst in the liquid hydrocarbon medium can be used and allowed to flow downwardly through a tower, and ethylene alone or ethylene dissolved in a suitable hydrocarbon medium can be injected into the lower portion of the tower or at various elevations within the tower. Slurry of catalyst and polymer is withdrawn and unconverted ethylene recycled to the reaction zone.

The ethylene charged into the reactor may contain small amounts of saturated hydrocarbons such as methane, ethane, and the like. It should, however, be essentially moisture and oxygen-free.

The alkali and alkaline earth metal reduced group IVb metal oxide-on-alumina compositions used in the examples were prepared by impregnating alumina beads with an organic solvent solution of a group IVb metal alkoxide, hydrolyzing drying, and then exposing the compositions thus obtained to alkali metal vapor at a temperature of at least 300° C. under reduced pressure. Instead of using the group IVb metal alkoxide, a salt of the metal with an inorganic or organic acid which is hydrolyzable, pyrolyzable, or burnable to the oxide can be employed. Examples are the chloride, nitrate, sulfate, acetate, propionate, etc.

In place of the isopropyl esters there can be used other group IVb metal alkoxides such as titanium (IV) ethoxide, titanium (IV) heptoxide, thorium (IV) hexoxide, thorium (IV) isobutoxide, hafnium (IV) decyloxide, hafnium (IV) dodecyloxide, and the like.

The group IVb metals are titanium, hafnium, zirconium and thorium.

In practice the group IVb metal alkoxide is dissolved in a volatile solvent to produce a solution containing from 5 to 25% alkoxide by weight and this solution is used to impregnate the alumina support. The oxide is formed directly on the support. The amount of group IVb metal oxide thus deposited on the support will be between 0.1 and 20% by weight. The amount of the group IVb metal oxide deposited on the aluminum is not critical. In general an excess of alumina is preferred. Alternatively, the group IVb metal oxide may be deposited by exposing the support to vapors of the group IVb metal alkoxide and when the group IVb metal alkoxide is a liquid it may be used as such to impregnate the support. In each case the group IVb metal alkoxide can be converted to the oxide by hydrolysis or by complete oxidation of the organic portion of the molecule.

The particular pressure at which the polymerization is effected depends upon such interdependent factors as temperature and activity of the catalyst. As a rule it is not necessary to use pressures above 1000 atmospheres to obtain good conversions of the ethylene at reasonable rates. Most generally, the pressure will be between atmospheric and 100 atmospheres.

The temperature at which the polymerization is conducted can be varied over wide limits. In general, it is preferred to operate at as low a temperature as possible in order to reduce power requirements and simplify equipment design. The temperature may vary from that of the room to 250° C. With active catalysts and pressures of 10 to 200 atmospheres it will be between 100° and 225° C.

The amount of catalyst is not critical, but in a batch process in a 400-ml. reactor it will be between 0.5 and 10 grams, based on the ethylene charged.

Under the preferred conditions of temperature and pressure employing from 1 to 7 g. of catalyst in a 400-ml. reactor, the time of reaction will be between 4 and 20 hours. If desired, however, the time may be shortened or lengthened by varying the conditions of operation.

The alkali or alkaline earth metal reduced group IVb metal oxide-on-alumina compositions are uniquely active as catalysts for polymerizing monoolefins as ethylene, propylene, styrene, etc. They are especially valuable for polymerizing ethylene because essentially all of the product is high molecular weight. These compositions are also effective for preparing copolymers of ethylene and other monoolefins. Examples of copolymerizable olefines are propylene, the butylenes, butadiene, isoprene, heptene and styrene.

I claim:

1. A catalyst composition useful for the polymerization of ethylenically unsaturated compounds which comprises the product obtained by extending on alumina a metal oxide wherein the said metal is an element of group IVb of the periodic table, there being present no compound of a transition element of any group other than said group IVb, and thereafter contacting, at a temperature of at least 300° C., said metal oxide extended on alumina with the vapor of a metal of the class consisting of alkali metals and alkaline earth metals of atomic numbers 3 through 56.

2. A catalyst composition useful in the polymerization of ethylenically unsaturated compounds, which comprises the product obtained by extending on alumina a titanium oxide, there being present no compound of a transition element other than said titanium, and thereafter contacting, at a temperature of at least 300° C., said titanium oxide extended on alumina with the vapor of a metal of the class consisting of alkali metals and alkaline earth metals of atomic numbers 3 through 56.

3. A catalyst composition useful in the polymerization of ethylenically unsaturated compounds, which comprises the product obtained by extending on alumina a zirconium oxide, there being present no compound of a transition element other than said zirconium and thereafter contacting, at a temperature of at least 300° C., said zirconium oxide extended on alumina with the vapor of a metal of the class consisting of alkali metals and alkaline earth metals of atomic numbers 3 through 56.

4. The process of polymerizing at least one terminally unsaturated olefin which comprises contacting said terminally unsaturated olefins with a catalyst obtained on extending on alumina a metal oxide, wherein the said metal is an element of group IVb of the periodic table, there being present no compound of a transition element of any group other than said group IVb, said metal oxide being employed in a concentration of 0.1 to 20% by weight of said alumina, and thereafter contacting, at a temperature of at least 300° C., said metal oxide extended on alumina with the vapor of a metal of the class consisting of alkali metals and alkaline earth metals of atomic number 3 through 56, said metal being employed in a concentration of 1 to 1000% by weight of the said metal oxide.

5. The process as set forth in claim 4 wherein the terminally unsaturated olefin is propylene.

6. The process as set forth in claim 4 wherein the terminally unsaturated olefin is styrene.

7. The process as set forth in claim 4 wherein the terminally unsaturated olefin is a mixture of ethylene and propylene.

8. The process of polymerizing ethylene which comprises contacting ethylene with a catalyst obtained on extending on alumina a metal oxide, wherein the said metal is an element of group IVb of the periodic table, there being present no compound of a transition element of any group other than said group IVb, said metal oxide being employed in a concentration of 0.1 to 20% by weight of said alumina, and thereafter contacting, at a temperature of at least 300° C., said metal oxide extended on alumina with the vapor of a metal of the class consisting of alkali metals and alkaline earth metals of atomic numbers 3 through 56, said metal being employed in a concentration of 1 to 1000% by weight of the said metal oxide.

9. The process of claim 8 wherein the metal oxide is titanium oxide.

10. The process of claim 8 wherein the metal oxide is zirconium oxide.

11. The process as set forth in claim 8 wherein the member of the class consisting of alkali metals and alkaline earth metals is sodium.

12. The process for preparing a catalyst composition useful for the polymerization of ethylenically unsaturated compounds, which comprises impregnating alumina with a metal alkoxide wherein the said metal is an element of group IVb of the periodic table, there being present no compound of a transition element of any group other than said group IVb, said metal alkoxide being employed in sufficient concentration to provide from 0.1 to 20% of metal oxide by weight of said alumina, hydrolyzing said metal alkoxide extended on alumina and thereafter contacting, at a temperature of at least 300° C., the resultant metal oxide extended on alumina with the vapor of a metal of the class consisting of alkali metals and alkaline earth metals having atomic numbers 3 through 56, said metal being employed in a concentration of 1 to 1000% by weight of the said metal oxide.

13. The product of claim 12.

14. The process as set forth in claim 12 wherein the metal alkoxide is titanium alkoxide.

15. The process as set forth in claim 12 wherein the metal alkoxide is zirconium alkoxide.

16. The process as set forth in claim 12 wherein the member of the class consisting of alkali metals and alkaline earth metals is sodium.

17. A catalyst composition useful for the polymerization of ethylenically unsaturated compounds which comprises the product obtained by extending on alumina a metal oxide wherein the said metal is an element of group IVb of the periodic table, there being present no compound of a transition element of any group other than said group IVb, said metal oxide being employed in a concentration of 0.1 to 20% by weight of said alumina, and thereafter contacting, at a temperature of at least 300° C., said metal oxide extended on alumina with the vapor of a metal of the class consisting of alkali metals and alkaline earth metals of atomic numbers 3 through 56, said metal being employed in a concentration of 1 to 1000% by weight of said metal oxide.

18. The catalyst composition as set forth in claim 17 wherein the group IVb metal oxide is titanium oxide.

19. The catalyst composition as set forth in claim 17 wherein the group IVb metal oxide is zirconium oxide.

References Cited in the file of this patent

UNITED STATES PATENTS

| | | |
|---|---|---|
| 2,231,446 | Grosse | Feb. 11, 1941 |
| 2,367,622 | Schulze | Jan. 16, 1945 |
| 2,436,256 | Hanford | Feb. 17, 1948 |
| 2,454,227 | Smith | Nov. 16, 1948 |
| 2,605,238 | Kranty | July 29, 1952 |
| 2,694,049 | Reynolds | Nov. 9, 1954 |